United States Patent [19]
Evans

[11] 3,806,131
[45] Apr. 23, 1974

[54] SWING MEASUREMENT AND DISPLAY SYSTEM FOR ATHLETIC IMPLEMENTS

[75] Inventor: James W. Evans, Largo, Fla.

[73] Assignee: Athletic Swing Measurement, Inc., Clearwater, Fla.

[22] Filed: Mar. 29, 1972

[21] Appl. No.: 239,195

[52] U.S. Cl. .................... 273/186 A, 340/177 R
[51] Int. Cl. ............................................. A63b 69/36
[58] Field of Search...... 273/186, 26 A, 29 A, 73 R, 273/183

[56] References Cited
UNITED STATES PATENTS
3,270,564  9/1966  Evans ............................. 273/186 A
3,194,563  7/1965  MacKniesh .................... 273/186 A Primary Examiner—George J. Marlo
Attorney, Agent, or Firm—Duckworth, Hobby & Allen

[57] ABSTRACT

A system and method for measuring at least one element of motion, e.g, torque, of a moving member and visually displaying the element as a series of bars each at a discrete time interval during movement. The slope of each bar is relative to the magnitude of the element during the corresponding time interval. The system may be employed to depict the position of the face of a golf club relative to the shaft during the swing, in which torque about the club shaft is measured by a torque gauge which provides an output representative of torque during the swing of the club. This output is transmitted to logic generating means which provides the series of bars.

7 Claims, 3 Drawing Figures

SWING MEASUREMENT AND DISPLAY SYSTEM FOR ATHLETIC IMPLEMENTS

BACKGROUND OF THE INVENTION

This invention relates to measurement systems, and relates in particular to a system for measuring the characteristics of motion of an athletic implement.

In U. S. Pat. No. 3,270,564, I disclose a system for measuring three elements of motion (acceleration, torque and flex) of an athletic implement, as a golf club, during use. In this system, any one or all of these three elements are sensed while the implement is in use and converted to an electrical signal. This signal is transmitted to a nearby console, where it is processed and visually displayed, either as an analog waveform on an oscillograph, or is converted to a digital format for a printout comparison with a reference signal.

In U. S. Pat. application Ser. No. 93,200, filed Nov. 27, 1970, now Pat. No. 3,717,857, disclose a system which may be worn on the athlete's arm.

SUMMARY OF THE INVENTION

The present invention comprises a system for measuring and visually displaying at least one element of motion of a member. Means associated with the member measures the element of motion, and visually displays the element as a series of bars each at a discrete time interval during the motion period. The slope of each bar is relative to the magnitude of the motion element during the corresponding time interval.

In one embodiment, the torque about one axis of the member may be measured and visually displayed as the series of bars, to depict any deviation between an end portion and the axis during motion.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

An embodiment of the invention is described below with reference to FIG. 1. In this embodiment, the torque on the shaft of a golf club during the swing is measured and visually displayed as a series of bars, the inclination of each bar being illustrative of the position of the face of the club head during the corresponding time interval. It will be understood, however, that the invention is not limited to this embodiment, and may be employed in a variety of other applications.

Figure 1:
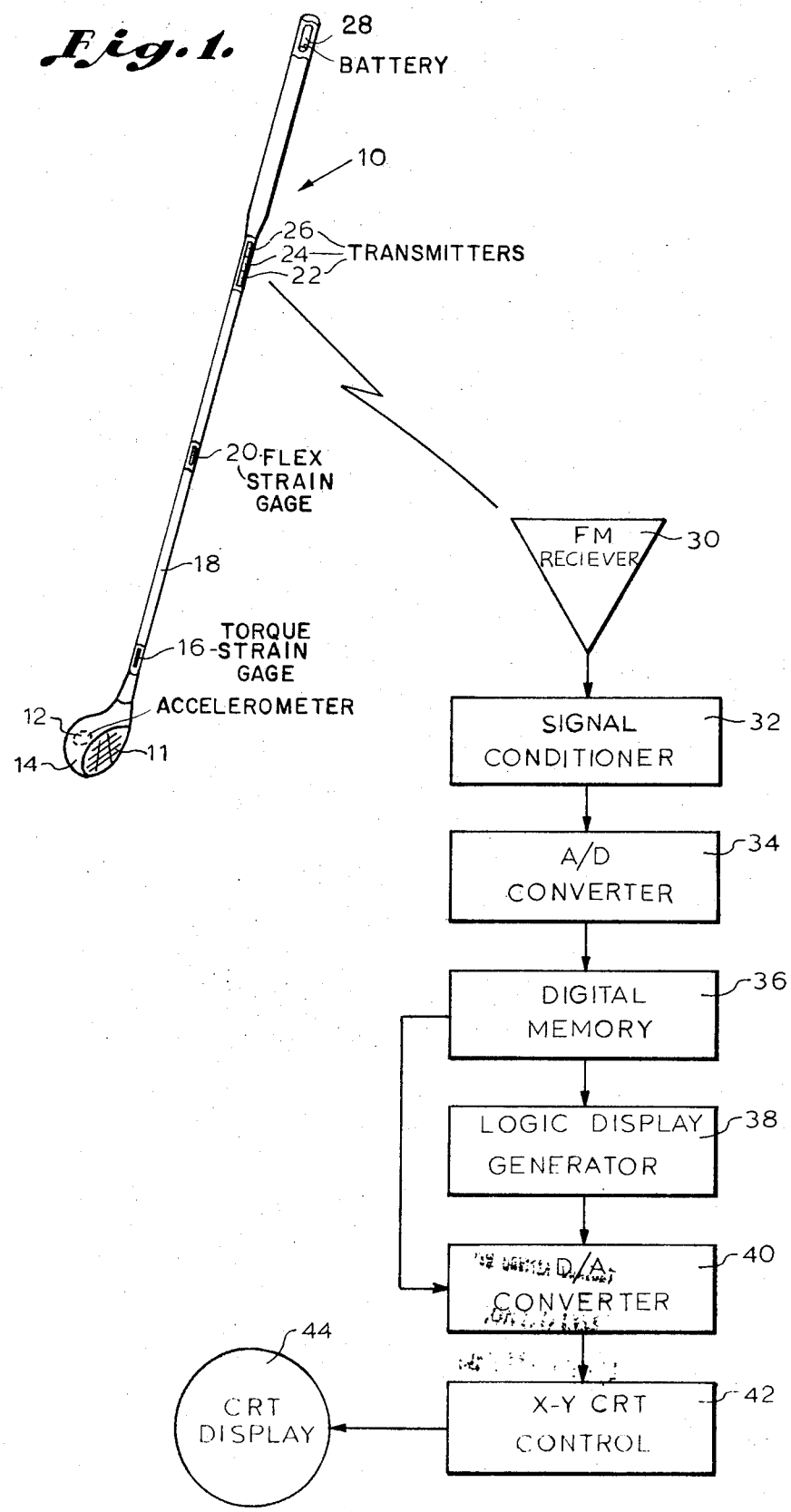
FIG. 1 is an illustration, partly in block diagram form, of an embodiment of the invention.

The embodiment of FIG. 1 includes a golf club 10 having a club head 14 and a shaft 18. The club head 14 includes a club face 11 which is adapted to strike a golf ball. An accelerometer 12 is located in the club head 14 and is adapted to measure the acceleration of the club head 14 during the swing. A torque strain gage 16 is positioned within the shaft 18 proximal to the club head 14 and is adapted to measure the torque, or angular momentum, about the axis of the shaft 18 during the swing. A flex strain gage 20 is positioned in an intermediate region of the shaft 18 and is adapted to measure the flex, or bending, of the shaft 18 during the swing. Each of the accelerometer 12, the torque gage 16, and the flex gage 20, are capable of providing an analog electrical output which indicates the magnitude of the corresponding element of motion (acceleration, torque, and flexure, respectively) with respect to time.

The golf club 10 further comprises means for transmitting the respective outputs of the accelerometer 12 and the gages 16, 20 to a nearby console for further processing and display as described below in greater detail. The transmission means may comprise, as shown in FIG. 1, three F.M. transmitters 22, 24 and 26 which transmit (either on three different frequencies or a single multiplexed frequency) a signal modulated by the output of the accelerometer 12, the torque gage 16, and the flex gage 20, respectively. The shaft 18 serves as a transmitting antenna for the transmitters 22, 24 and 26. The gages 12, 16 and 20 and the transmitters 22, 24 and 26 are powered by a voltage source 28, such as a D.C. battery, which is located in the upper portion of the shaft 18. The golf club 10, as described thus far, is essentially identical to the instrumented golf club described in the Pat. No. 3,270,564.

In an alternate arrangement of the system of FIG. 1, a carrier frequency is transmitted from the nearby consols to a passive repeater circuit in the club 10. The carrier is modulated by the outputs of the gages 12, 16 and 20 and retransmitted to the console for processing display. This system is disclosed in my U. S. application Ser. No. 205,067, filed Dec. 6, 1971.

The system of FIG. 1 further includes an FM receiver 30 for receiving and demodulating the signals transmitted from the golf club 10. The receiver 30 and other signal processing and display circuits and components described below may be housed in a record/playback console such as that disclosed in the aforementioned patent.

The output of the receiver 30 is fed to a signal conditioning or filter circuit 32 which includes means for discarding noise. The output of the signal conditioner 32 is fed to an analog-to-digital converter 34, where the analog outputs of the accelerometer 12 and the torque and flex gages 16 and 20 are translated into a digital format having digital sampling points for predetermined time periods, preferably on the order of every 6 milliseconds.

The digital output of the converter 34 is then fed to a memory circuit 36 which serially stores the digital signals representing the three elements of motion sensed in the golf club 10.

The stored digital signals representative of the output of the accelerometer 12 and flex gage 20 are, on call, fed directly to a digital-to-analog converter 40. Simultaneously, the torque digital signal is fed to a display logic subsystem 38, where the average change of the torque digital signal for discrete time intervals is first determined. The discrete time interval is greater than the period of each digital sampling point (suitable, this discrete time interval is 30 milliseconds). The average change for each discrete time interval is then added to the net change of the previous time interval, and a net total during the time interval is obtained. This net total is thereafter fed to the display logic generator where a predetermined CRT bar position signal is generated relative to the net value during the corresponding time interval. Preferably, the bar generator is capable of generating about 20-25 bars that vary incrementally in slope about the X axis of a CRT which is used for display. It is preferably to preselect a bar normal to the X axis in the direction of the positive Y axis to represent a net total value of zero. The series of preselected display bar signals then joins the acceleration and flex signals in the digital-to-analog converter 40, where the three digital signals are converted to analog outputs which are, in turn, fed to a cathode-ray tube X-Y control circuit 42.

Figure 2:
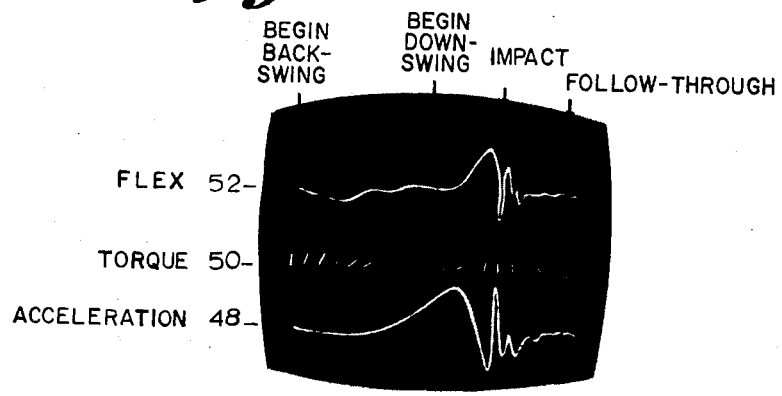
FIG. 2 depicts a visual display which may be obtained from the system of FIG. 1.

The CRT control circuit 42 drives a cathode-ray tube (oscilloscope) 44 to generate two analog waveforms 48 and 52, as shown in FIG. 2, which depict the outputs of the accelerometer 12 and flex strain gage 20, respectively, during the swing. The output of the torque strain gage 16 is simultaneously displayed on the CRT 44 as a display bar series 50, each bar being generated during one of the discrete time intervals of the swing. As described above, each bar in the series 50 is preselected to represent a given magnitude of net torque. All of the bars in the series 50 are of equal length and are displayed with at least one end of bar on a line common to all of the bars in the series, which, in this embodiment, is parallel to the axis of the CRT 44. The one bar which is substantially normal to the axis 51 and represents a net total value of zero is displayed during any discrete time interval in which substantially no torque is sensed by the torque strain gage 16 in the golf club 10 during the swing. Thus, the system is referenced such that any bar normal to the line 51 is representative of the shaft 18.

In a like manner, the other bars in the series are preselected so that a first positive net value of torque (as +1, for example) is represented by a bar which is inclined clockwise from the vertical bar; a second positive net value of torque greater than the first positive value (as +2) is represented by a bar inclined yet a greater degree from the vertical bar, and so on. Thus, the slope of each bar (change normal to the common line divided by the change along that line) is inversely proportional to the net total value during the corresponding discrete time interval. In this way, each bar is representative of the position of the face 11 of the club head 14 relative to the shaft 18 during the corresponding time interval, as described in greater detail with reference to FIGS. 2 and 3.

Figure 3:
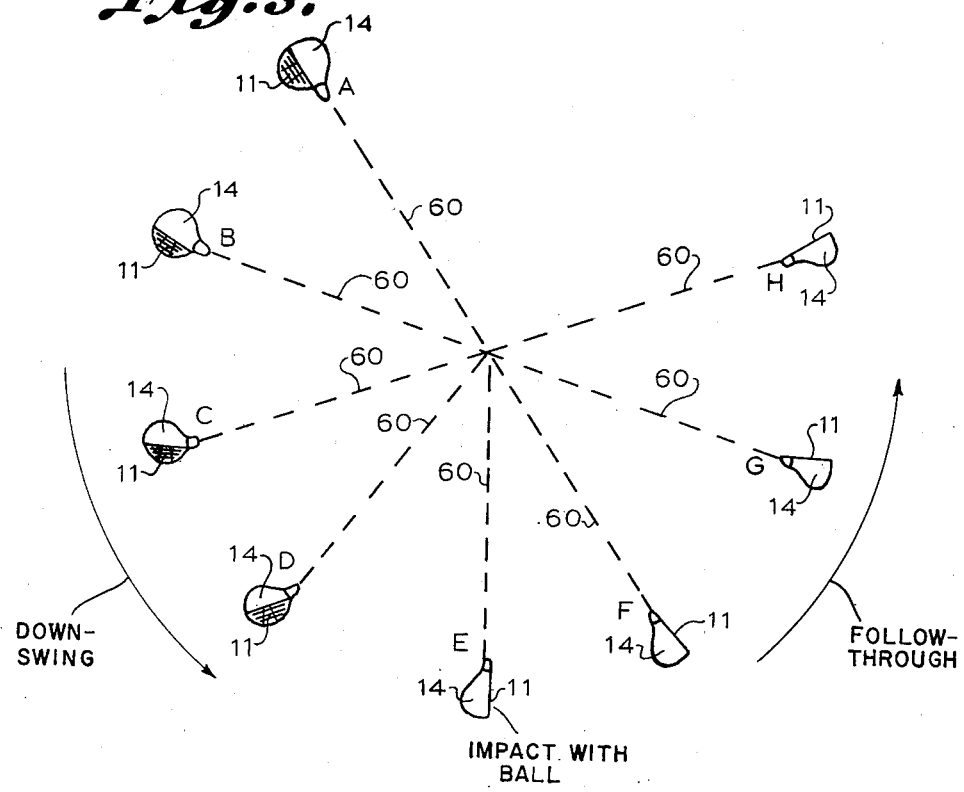
FIG. 3 is a pictorial representation of a head of a golf club at discrete time intervals during the swing.

FIG. 3 illustrates the club head 14 and face 11 of the golf club 10 at eight positions A-H during an ideal swing. Each dotted line 60 represents the shaft 18 when at rest. At position A, the club is at the top of the backswing, and the torque that has been sensed by the torque strain gage 16 of FIG. 1 is significant. Consequently, during the time interval corresponding to position A, a bar is displayed on the CRT 44 which is not normal to the common line (Note FIG. 2).

At position B, the golfer is further into the downswing. As a result, the club head 14 creates a clockwise torque about the shaft (as viewed by the golfer) which decreases through positions C and D. These decreasing values of torque are represented in the bar series by bars which have slopes which vary inversely proportional to the torque about the shaft 18. As a result, each of the bars illustrates the proportional deviation of the club face 11 relative to the shaft.

Ideally, at about position D, the centrifugal force causes the club face to close into the ball thereby presenting the face 11 evenly to the ball at impact position E; thus, little or no torque is measured during the corresponding time interval.

During followthrough positions F, G and H some torque is usually sensed, depending upon several factors, for example, where the golf ball is struck on club face 11.

While the invention has been described with respect to a system for visually displaying the club face position of a golf club during the swing, it will be appreciated that the system may also be employed to display the face position of other athletic implements, such as a tennis racket or a baseball bat. Further, the system may be used in any application where it is desirable to visually display the deviation of an end portion of a member during motion.

Other embodiments such as having the bars illustrated as arrows indicative of the direction of the club are also anticipated as being within the scope of the invention, which invention is not to be construed as limited to the particular forms disclosed herein, since there are to be regarded as illustrative rather than restrictive.

I claim:

1. An athletic swing measurement and display system, comprising:

an athletic implement having a shaft and an end portion attached thereto, said end portion having a face which is a adapted to strike a ball;

means associated with said implement for sensing an element of motion of said implement about said shaft during the swing and providing an electrical signal which varies in magnitude relative thereto;

means responsive to the output of said sensing means for visually displaying a series of bars, each having an end disposed on a common line; and means for preselecting said bars so that a bar normal to said common line represents said face at a position wherein said face should impact said ball, and the other bars are sloped inversely proportional to the magnitude of said signal during a corresponding discrete time interval to indicate deviations from said position.

2. A system as recited in claim 1, wherein said visual display means comprises:

means responsive to said sensing means for receiving and converting said signal to a series of digital values;

data averaging means responsive to said digital values for obtaining an average value of a number of said digital values during each one of said discrete time intervals;

means responsive to said averaging means for adding said average value to the average values of all of the previous time intervals to obtain a net total value for each said discrete time interval;

means for converting the output of said adding means to an analog electrical signal; and means responsive to said analog signal for displaying said bar series on a cathode-ray tube.

3. A system as recited in claim 2, further comprising means for serially storing said digital values, said storage means being electrically interposed between said converting means and said data averaging means.

4. A system as recited in claim 2, wherein said receiving and converting means comprises:
- receiving means responsive to a frequency-modulated signal representative of the output of said sensing means;
- signal conditioning means responsive to said receiver; and
- analog-to-digital converting means responsive to said conditioning means.

5. A system as recited in claim 4, wherein said sensing means is carried by said athletic implement.

6. A system as recited in claim 5, further comprising transmitting means mounted in said shaft and responsive to said sensing means for transmitting said frequency-modulated signal.

7. A golf club swing measurement and display system, comprising:
- a golf club having a shaft and a head attached thereto, said head having a face which is adapted to strike a golf ball;
- a torque strain gage mounted in said shaft proximal to said head, said gage being adapted to sense torque during a swing and provide an electrical signal which varies in magnitude relative thereto;
- means carried by said shaft and coupled to said gage for transmitting an output modulated by said signal;
- a measurement and display console remote from said golf club comprising:
  - means for receiving and demodulating said output and reproducing said signal;
  - means coupled to said receiver for conditioning said signal;
  - means responsive to said conditioning means for converting said signal to a series of digital values;
  - means responsive to an input of said digital values for averaging a number of said values during a discrete time interval;
  - means responsive to said averaging means for adding said average value to the average values for all of the previous time intervals to obtain a net total value for each time interval;
  - logic display means responsive to said adding means for generating a series of bar signals, each bar signal being preselected to represent a given one of said net total values;
  - means responsive to said display means for converting said bar signal to a bar analog signal;
  - means responsive to said analog signal for generating a bar series visual display, each bar having one end on a common line and a bar normal to said line being preselected to represent a net total value of zero, with increasing positive net total values being represented as preselected bars which incline increasingly clockwise from said normal bar; and wherein
- each bar visually displays the position of said face during the corresponding time interval.

* * * * *